(12) United States Patent  (10) Patent No.: US 6,357,358 B2
Henderson  (45) Date of Patent: Mar. 19, 2002

(54) MAGNETIC LEVITATION TRANSPORT SYSTEM

(76) Inventor: J. Kirston Henderson, 1709 Ridgmar Blvd., Fort Worth, TX (US) 76116-2016

( * ) Notice: Subject to any disclaimer, the term of this patent is extended or adjusted under 35 U.S.C. 154(b) by 0 days.

(21) Appl. No.: 09/801,397

(22) Filed: Mar. 7, 2001

Related U.S. Application Data

(60) Provisional application No. 60/187,610, filed on Mar. 7, 2000.

(51) Int. Cl.[7] .............................................. B60L 13/00
(52) U.S. Cl. ............. 104/281; 104/130.02; 104/130.07; 104/286; 104/282; 104/292
(58) Field of Search ................................. 104/281, 282, 104/283, 286, 287, 290, 292, 294, 130.02, 130.03, 130.07; 310/12

(56) References Cited

U.S. PATENT DOCUMENTS

| | | | |
|---|---|---|---|
| 3,267,402 A | | 8/1966 | Reimer ........................ 336/200 |
| 3,560,904 A | | 2/1971 | Wilkes ........................ 336/180 |
| 5,180,048 A | * | 1/1993 | Kawada et al. ............. 104/282 |
| 5,270,593 A | * | 12/1993 | Levi et al. ................... 104/292 |
| 5,517,924 A | * | 5/1996 | He et al. ..................... 104/286 |
| 5,865,123 A | | 2/1999 | Powell ........................ 104/281 |
| 6,044,770 A | * | 4/2000 | Davey et al. ............... 104/282 |
| 6,101,952 A | * | 8/2000 | Thronton et al. ........... 104/282 |

* cited by examiner

Primary Examiner—Mark T. Le
(74) Attorney, Agent, or Firm—Bracewell & Patterson, L.L.P.

(57) ABSTRACT

A transport system has a pair of levitating rails, each of the levitating rails has a core with a plurality of coils extending circumferentially around each of the cores. The coils are perpendicular to the lengths of the levitating rails. Each of the levitating rails has an upper surface directly above the core. A vehicle has wheels that roll on the upper surfaces of the levitating rails in a nonlevitating position. The vehicle has a plurality of magnets that create magnetic fields that pass through the coils while the vehicle is moving along the levitating rails. The magnetic fields induce current, which in turn causes an opposing magnetic field that levitates the vehicle. A steering rail having a plurality of coils is mounted to at least one of the guideways. Permanent steering magnets are located on each side of the steering rail to magnetically steer the vehicle along the guideways.

17 Claims, 6 Drawing Sheets

MAGNETIC LEVITATION TRANSPORT SYSTEM

PRIORITY CLAIM

This application claims the benefit of provisional application Ser. No. 60/187,610, filed Mar. 7, 2000.

FIELD OF THE INVENTION

This invention relates in general to transporting of vehicles by a mass transport system and in particular to a system that will magnetically levitate transporting vehicles.

DESCRIPTION OF PRIOR ART

In U.S. Pat. No. 6,039,135, issued Mar. 21, 2000, a mass transport system is shown that utilizes a pair of guideways. Each guideway has a shroud surrounding it with a slot for receiving an axle of a vehicle. The vehicle may either be a ferry for hauling conventional automobiles and trucks, or it may be a special purpose vehicle that carries cargo and/or passengers. The vehicle has wheels that roll on tracks located within the shrouds. The vehicle may be powered electrically or by other means.

One factor that limits the speed of such a system comprises the rolling components, which create friction. Prior art exists that employ permanent magnets located on the undersides of components of a train. These magnets are placed in proximity to a series of separate, individually wound coils of copper wire that are mounted adjacent to the tracks. The copper wire is wound at a 90° angle to the direction of the train travel.

As the train is moved along the rails, the magnetic fields of the permanent magnets pass through the coils of copper wire. This induces currents in the coils that in turn produce opposing magnetic fields to the permanent magnets. This causes the permanent magnets to be repulsed from the coils, thereby levitating components of the train above the rails. Additional coils are also located at the sides of the rail system. The train components have permanent magnets mounted at the sides in such a manner to interact with the coils at the sides, thereby providing horizontal direction control for the vehicles.

The prior art systems have disadvantages. Magnetic levitation systems cannot be used in railway switching areas, making it necessary for vehicles to slow to a low speed and exit the magnetic levitation segments of the rails for track-to-track switching by conventional railroad means. The magnetic levitation coils are added to the outsides of the conventional railway rails, thereby requiring a railway bed of greater width than conventional railroads. These railways have been expensive to build because of extensive land grading and/or massive structural supports for heavy elevated railways. Also, they are expensive because of the large number of separate, individually wound coils of copper wire that form the magnetic levitation rails.

SUMMARY OF THE INVENTION

The transport system of this invention uses a pair of levitating rails. Each levitating rail has a core and a plurality of coils extending circumferentially around the core perpendicular to the length of the levitating rail. Also, each of the levitating rails has an upper surface located directly above the core. A vehicle used on the transport system has wheels that roll on the upper surfaces of the levitating rails while at a low speed. The vehicle has a plurality of magnets which create magnetic fields that pass through the coils while the vehicle moves along the levitating rails. This induces in the coils, which causes magnetic fields to be generated that repel the magnetic fields of the permanent magnets. Once the speed begins to pick up, the levitating rails will levitate the vehicle.

Each of the levitating rails has a hollow core that is nonmagnetic. The vehicle may be powered along the guideways by various systems, with one of them being a linear motor. The linear motor comprises power coils periodically spaced apart from each other along the length of the rails. The power coils are supplied with alternating current, which induces movement of the vehicle when its magnets react with the magnetic fields produced by the power coils.

Also, a steering rail is mounted adjacent to at least one of the levitating rails. The steering rail has a plurality of coils wrapped around a core. A pair of steering magnets are mounted to the vehicle and positioned on opposite sides of the steering rail. The steering magnets create magnetic fields that pass through the coils of the steering rail. This induces current in the coils, which causes magnetic fields to be generated that repel the magnetic fields of the permanent magnets. The opposing forces created by the magnets and the coils steer the vehicle by tending to cause the permanent magnets to remain substantially equidistant from the steering rail.

Preferably, there are steering magnets mounted to the vehicle on each side of the vehicle. In a switching area, steering rails are located in both guideways. One of the steering rails passes straight through the switching area for retaining the vehicle on a main track. The other steering rail diverges off into a branch line. If the vehicle is to be switched onto the branch line, an actuator on the vehicle causes the steering magnets on the main track side to move downward from the main track steering rail. At the same time, another actuator on the vehicle causes steering magnets on the branch side to be moved upward into proximity with the branch side steering rail. The branch side steering magnets will thus cause the vehicle to follow the branch rail, resulting in the vehicle exiting from the main track onto the branch line.

Preferably the steering rail is formed by providing sheets of substantial width. Each sheet, which may be of an insulating film such as Mylar, will have parallel traces of conductive strips formed on it. The conductive strips will be separated by insulation strips, which are air gaps between the strips. The sheet is wrapped in multiple wraps around the core to create multiple coils along the rails simultaneously. For use as a levitating rail, these coils will be shorted at each wrap so that each coil forms only a single loop.

DETAILED DESCRIPTION OF THE INVENTION

Figure 1:
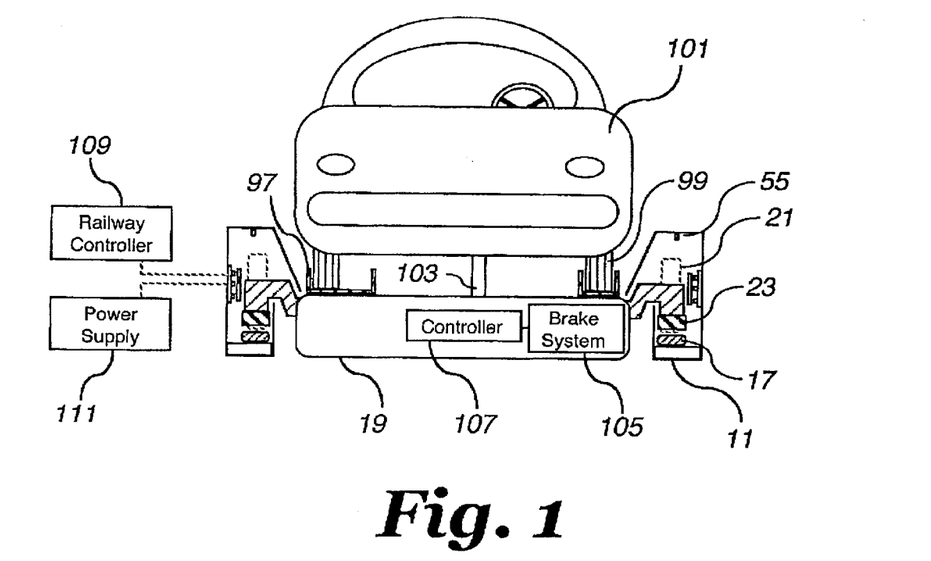
FIG. 1 is a schematic front view of an automobile located on a mass transport system constructed in accordance with this invention.
Figure 2:
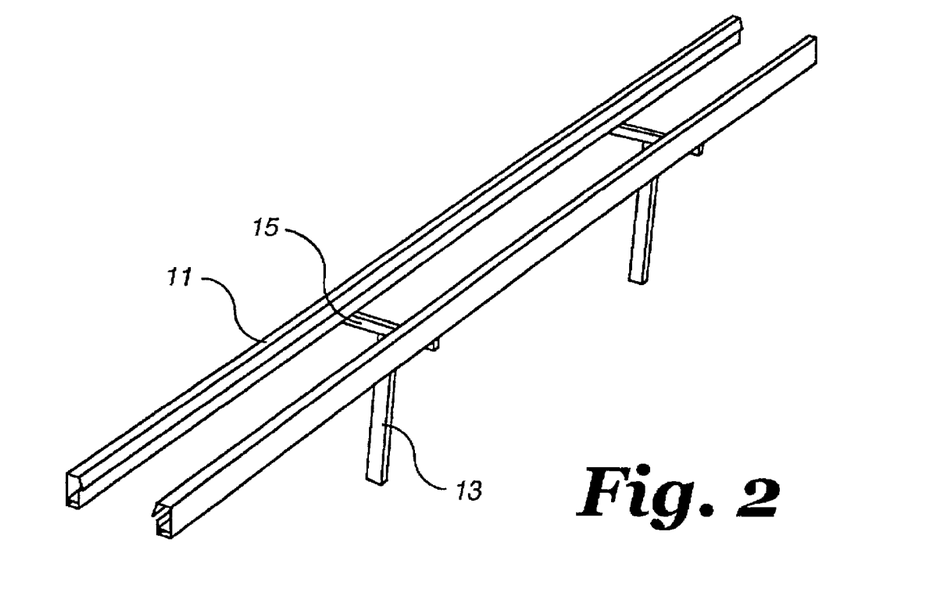
FIG. 2 is a perspective view of the guideways of the mass transport system of FIG. 1.

Referring to FIG. 1, the mass transport system includes a pair of guideways 11. Guideways 11 are mounted above the ground preferably on columns 13, as illustrated in FIG. 2. Guideways 11 are preferably spaced apart, leaving clear open spaces between them. Cross braces 15 at the upper ends of columns 13 support guideways 11 in a parallel manner.

Referring again to FIG. 1, each guideway 11 includes a levitating rail 17, which is shown schematically. Levitating rail 17 is made up of a series of coils that are passive; that is, they are not supplied with electrical power. A mass transport vehicle 19 has wheels 21 carried in guideways 11. Vehicle 19 also has a plurality of permanent magnets 23 that are positioned just above each levitating rail 17. Permanent magnets 23 create a magnetic field that passes through the coils of levitating rails 17. As vehicle 19 is moved along guideways 11 by a propulsion source, the moving magnetic fields of magnets 23 will induce a current flow in the coils of levitating rails 17. This causes a magnetic field that repels magnets 23, causing levitation of vehicle 19.

Figure 4:
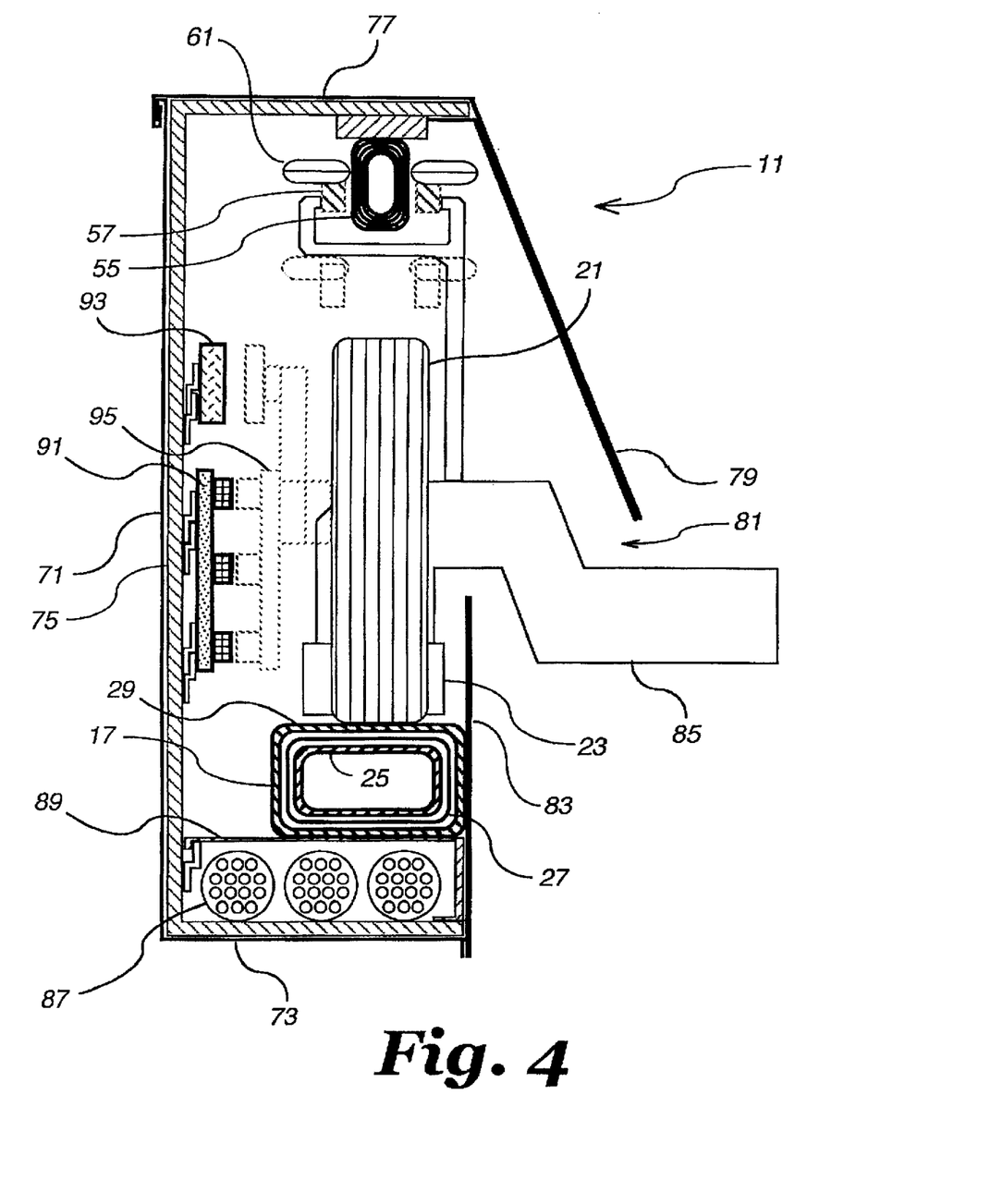
FIG. 4 is a sectional view similar to FIG. 3, but taken at a different point to show one of the wheels of the transporting vehicle.
Figure 5:
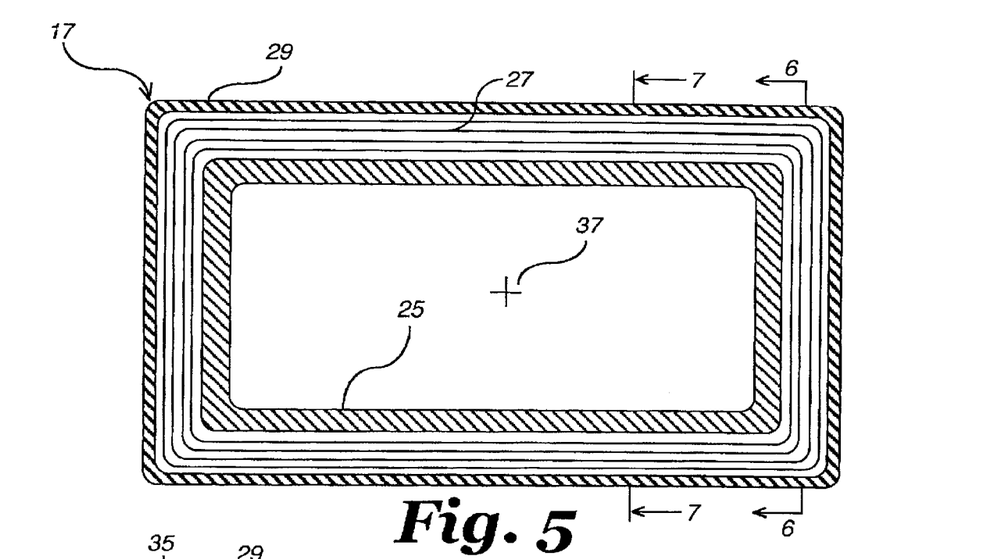
FIG. 5 is an enlarged sectional view of one of the levitating rails of the mass transport system of FIG. 1.

Referring to FIG. 5, each levitating rail 17 has a nonconducting core 25 of that is either hollow, as shown, or solid. It may be a high strength composite or other non-magnetic material. Core 25 may be rectangular as shown in FIG. 5 or other shapes, such as cylindrical. A series of electrical coils 27 are wrapped around core 25. An outer shell 29 is located over coils 27. Outer shell 29 is also of a nonconductive material, such as a composite. Preferably the upper surface of outer shell 29 is flat and faces upward for providing support for one of the wheels 21 (FIG. 4).

Figure 6:
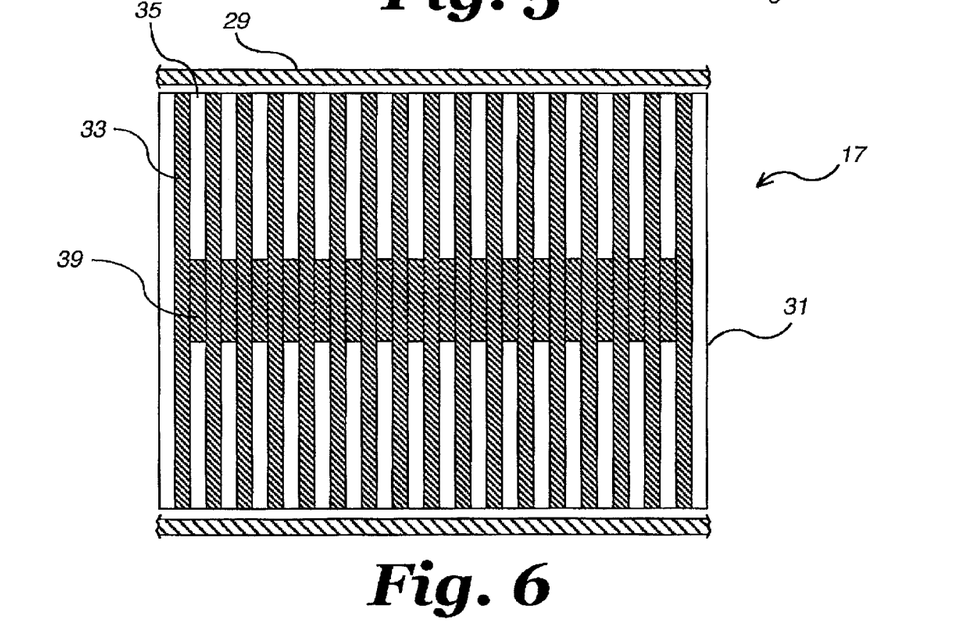
FIG. 6 is a sectional view of a portion of the levitating rail of FIG. 5, taken along the line 6—6 of FIG. 5.

Referring to FIG. 6, rather than wrapping core 25 with individual wrappings of copper wire to form coils 27, a sheet 31 is used to simultaneously wrap a large number of coils 27. Sheet 31 has a backing material of a nonconductive film such as Mylar, with electrically conductive traces or strips 33 are formed therein. Conductive strips 33 are parallel and spaced apart from each other, forming insulation strips 35 between them. Each insulation strip 35 comprises the Mylar backing material and air gap between conductive strips 33. Sheet 31 may be quite wide, say 20–50 ft. in width, thus will have a large number of conducive strips 33. Sheet 31 is wrapped around core 25 in a direction that places conductive strips 31 perpendicular to longitudinal axis 37 (FIG. 5) of core 25. Sheet 31 will be wrapped numerous times around core 37, although only three wraps are shown in FIG. 5. For example, there could be one hundred wraps around core 37 to achieve the desired magnetic forces.

Figure 9:
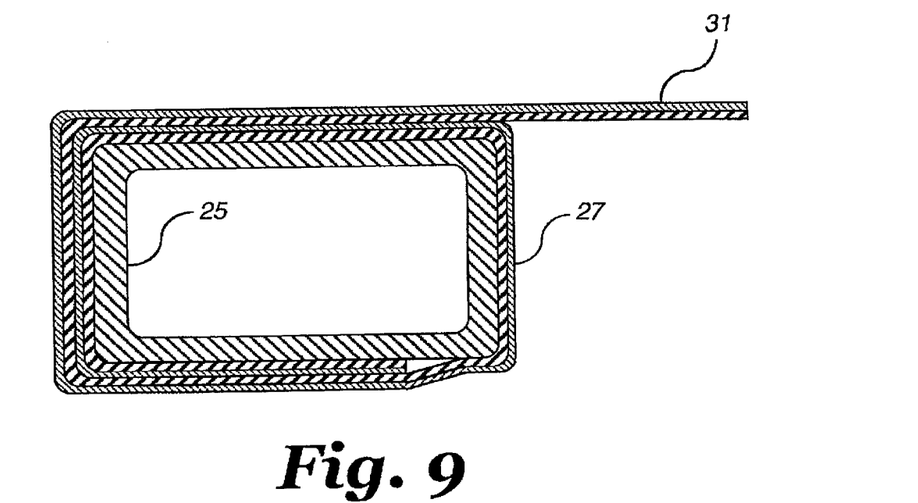
FIG. 9 is a schematic view illustrating one method for forming the levitating coil of FIG. 1.

Also, at each wrap, conductive strips 33 are electrically connected to each other by a shorting band 39, shown in FIG. 6. Shorting band 29 is located on both sides of the Mylar backing film of sheet 31. As it overlaps the preceding wrap, shorting band 29 will electrically contact the conductive strips 33 of the previous wrap. Consequently, each coil 27 formed by a conductive strip 33 extends only around core 25 one time, thus forming a single loop. Also, each single coil 27 will be electrically connected joined to the other conductive strips 33. Prior to wrapping sheet 31 around core 25, shorting bands 39 will be placed along the length of sheet 31 at desired intervals so that there will be only one turn of each coil 27. FIG. 9 illustrates the wrapping process, showing sheet 31 being drawn in a web from a large roll (not shown) of sheet material.

Figure 8:
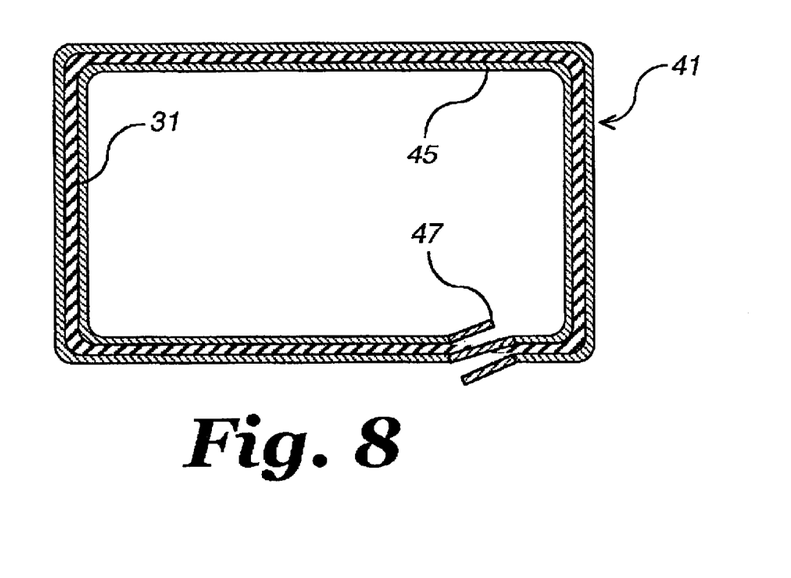
FIG. 8 is a sectional view of the levitating rail shown in FIG. 7, illustrating one of the power coils.

A propulsion system must be used for propelling vehicle 19 (FIG. 1) along guideways 11. The propulsion system could be a variety of devices, including an engine or electrical motor driving a propeller, or a jet engine. In the preferred embodiment, however, the propulsion system comprises an electrical linear motor. In the linear motor, a power coil 47 will be supplied with electrical power, unlike coils 27 of levitating rail 17. The power coil 41 is supplied with AC power from a power supply 43. Power coil 41 is preferably wrapped around core 25 and is formed on the same sheet 31 with levitating coils 27. Power coil 41 preferably comprises one or more conductive strips 45 that are not shorted to adjacent conductive strips 33 or to themselves with shorting band 39, as in FIG. 6. Rather conductive strips 45 are wrapped around the coil continuously, as shown in FIG. 8, resulting in a pair of leads 47, one at each end of the sheet. Conductive strips 45 are parallel to conductive strips 33 (FIG. 6) and may be identical in width.

Figure 7:
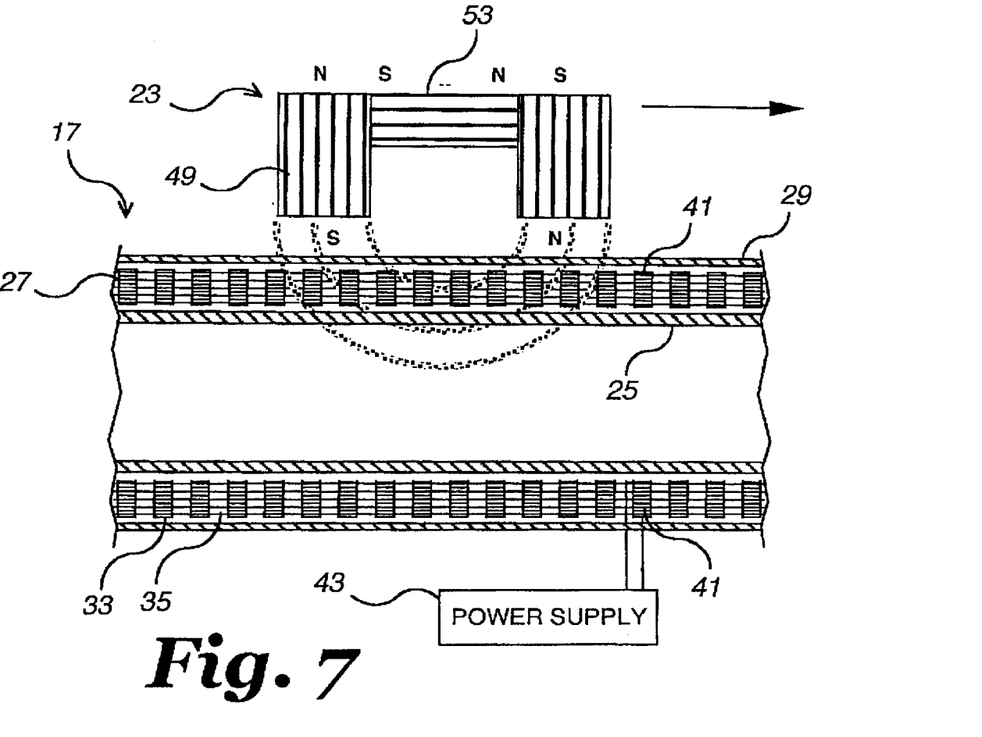
FIG. 7 is a schematic sectional view of the levitating rail of FIG. 5, taken along the line 7—7 of FIG. 5, and also showing magnets of the vehicle interacting with the levitating rail.

Referring again to FIG. 7, one of the magnets 23 is shown schematically. Magnet 23 is preferably a horseshoe type magnet, having a pair of downward facing legs 49 connected by a cross bar 53. This results in a downward directed north pole in one leg and a downward directed south pole in the other leg, creating a magnetic field passing in a semi-circular downward loop. The magnetic field extends through outer shell 29 and through coils 27 as well as power coil 41. As the magnetic fields of magnets 23 move longitudinally along the stationary levitating rail 17, the magnetic fields will create current in the coils 27. This current causes an opposite magnetic force which repulses magnets 23, causing vehicle 19 (FIG. 1) to levitate. At the same time, the electromagnetic field produced by the AC power supply 43 will induce forward motion of vehicle 19 in a direction indicated by the arrow.

Figure 3:
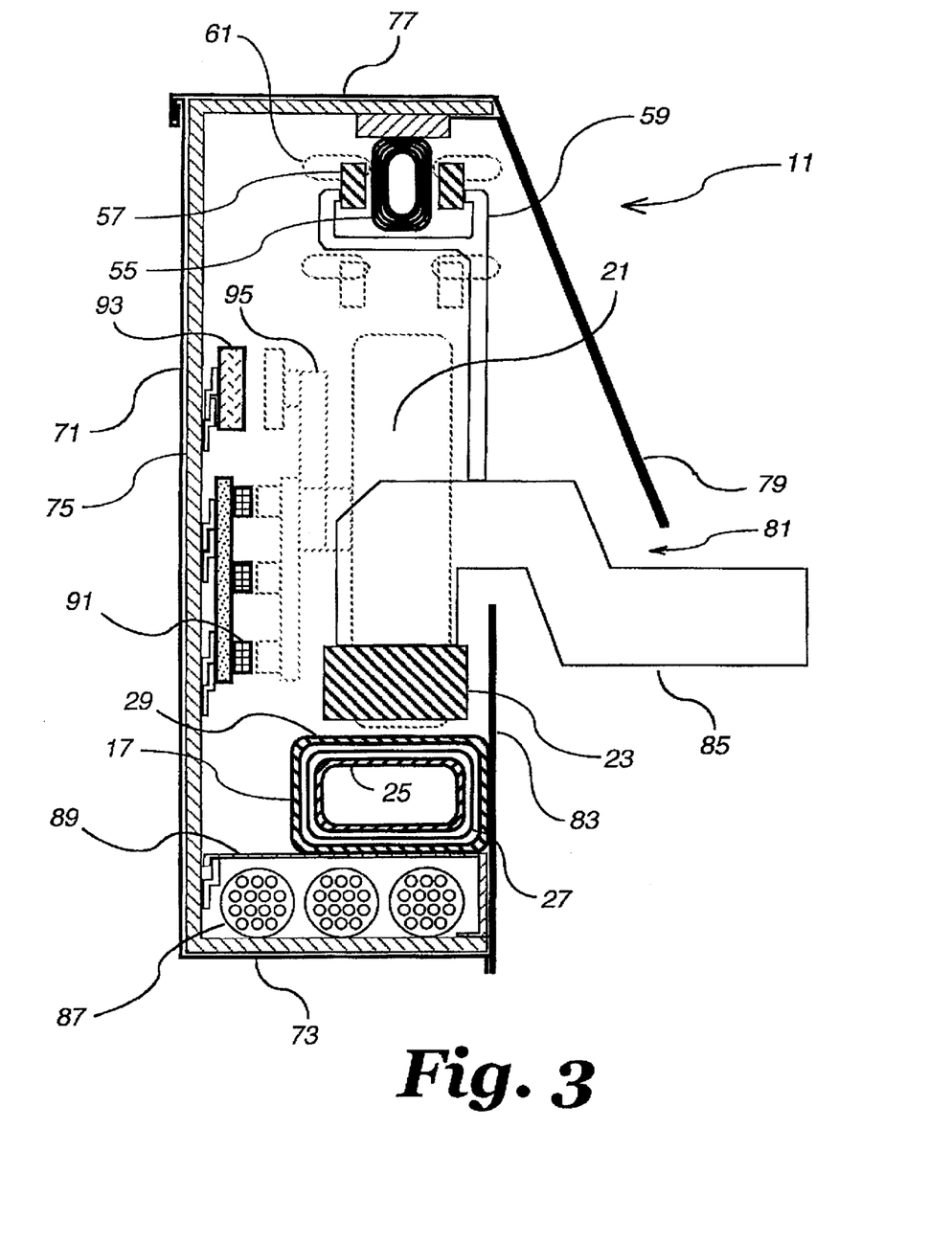
FIG. 3 is an enlarged sectional view of one of the guideways and a portion of the transporting vehicle of FIG. 1.

Although vehicle 19 (FIG. 1) could be steered mechanically or electrically, preferably vehicle 19 is magnetically steered along guideways 11. As shown in FIG. 3, this is handled by a steering rail 55 that is mounted within one of the guideways 11 above and adjacent levitating rail 17. Steering rail 55 is constructed in the same manner as levitating rail 17. FIG. 6, which illustrates levitating rail 17, also illustrates the construction of steering rail 55. Steering rail 55 comprises a plurality of coils, each having windings perpendicular to the length of the rail. Steering rail is also preferably constructed with a sheet 31 having conductive strips 33. It also is formed as a passive device, having a shorting band 39, resulting in single loop coils throughout its length. It does not have power coils similar to power coil 41.

A pair of steering magnets 57 are mounted by a mounting member 59 to vehicle 19 (FIG. 1) above one of the wheels 21 on each side of vehicle 19. Mounting member 59 will selectively position magnets 57 in close proximity to and on each side of steering rail 55. Steering magnets 57 are also permanent magnets and react in the same manner as levitating magnets 23. As they move along steering rail 55, their magnetic fields will induce current in the coils of steering rail 55, which in turn causes a magnetic field that repels magnets 57. This causes magnets 57 to tend to remain equidistant by small gaps from the sides of steering rail 55, thus steering the vehicle 19.

Mounting member 59, which is shown schematically, includes an actuator, which could be either a rack and pinion, telescoping tubes, a hydraulic cylinder, or other similar device. The actuator will move steering magnets 57 from the operational position shown by the solid lines in FIG. 3 to a storage position, shown by the dotted lines in FIGS. 3 and 4. In the storage position, steering magnets 57 will be located below steering rail 55, and their magnetic fields will not induce currents in the coils in steering rail 55.

In addition, a pair of rollers 61 are mounted to mounting member 59 adjacent each steering magnet 57. Steering rollers 61 are positioned in close proximity to the sides of steering rail 55 while in the operational position. Rollers 61 are positioned to roll on each side of steering rail 55 when steering is handled manually. Rollers 61 are employed, however, only at low speeds when the current being induced by the moving steering magnets 57 is not adequate to create enough of a counter-magnetic field to cause magnetic steering. Rollers 61 are preferably spaced laterally from contact with the sides of steering rail 55 while in a storage position. Actuators (not shown) will move them into contact with the sides of steering rail 55 if they are required for manual steering.

Figure 10:
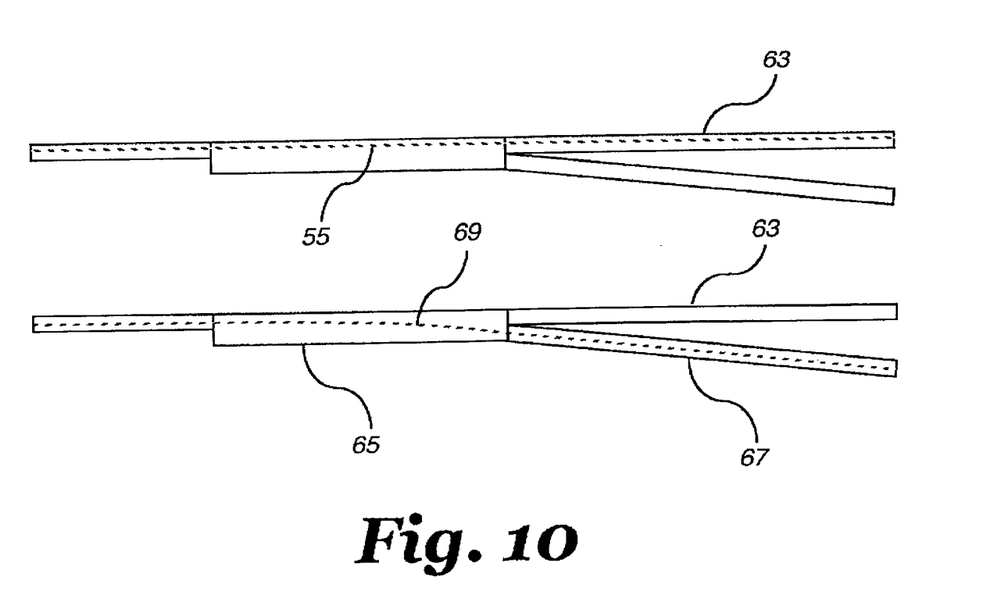
FIG. 10 is a plan view showing a switching section of the guideways of FIG. 1 leading to a branch section.

Steering may be accomplished with only a single steering rail 55, a single pair of steering magnets 57, and a single pair of rollers 61. However, for switching purposes, preferably there will be an identical set of steering magnets 57 and rollers 61 on both the right and left sides of vehicle 19. The reason for having steering capabilities on both sides is illustrated in FIG. 10. FIG. 10 shows a plan view of a main guideway track 63 which extends straight through a switching section 65. Switching section 65 has a branch track section 67 that diverts at an angle from main track section 63. One side, which is the left side in this drawing, has a steering rail 55 that extends straight through switching section 65 and continues along main track 63. The other side, which is the right side in this drawing, has a steering rail 69 that curves and follows one of the branch track sections 67. There will be no straight steering rail 55 following the right side main track section 63.

Assuming that the left hand steering magnets 57 are handling the steering on main track section 63, as the vehicle approaches or enters switching track section 65, the left side steering magnets 57 will be lowered by the actuator of mounting member 59 (FIG. 3). The actuator of mounting member 59 on the right side will simultaneously raise right side magnets 57 to the operational position. The right side steering rail 69 will electromagnetically guide vehicle 19 off to branch section 67. Once on branch section 67, the right side magnets 57 may be lowered and the left side magnets 57 again may be raised. Only one of the pairs of magnets 57 will be in an operational position at any given moment. The remaining components are discussed in U.S. Pat. No. 6,039,135, issued Mar. 21, 2000. Briefly, these include a shroud 71, such as shown in FIGS. 3 and 4. Shroud 71 encloses the components of each guideway 11 to prevent rain, ice and snow from affecting the operation. Shroud 71 has a lower end 73, an outer side 75 that extends vertically, and an upper side or end 77. Steering rail 55 is mounted to upper end 77 within shroud 71. Shroud 71 has an upper inner side 79 that inclines inward and downward. A slot 81 separates upper inner side 79 from a lower inner side 83, which is preferably vertical. Axle 85 of vehicle 19 is offset so as to fit over upper edge of lower inner side 83. Power and communication cables 87 extend through a lower compartment 89. Levitating rail 17 is located on top of compartment 89. Electrical power busses 91 and a control signal antenna or waveguide 93 are mounted to the interior of shroud 71 on the outer side 75. The vehicle has control and power pickup devices 95 to engage or interact with power bus 91 to supply electrical power and control vehicle 19.

Referring to FIG. 1, in the embodiment shown, vehicle 19 is a ferry having channels 97 on its upper side for receiving wheels 99 of an automobile, truck, or other type of vehicle 101. Automobile 101 may have a probe 103 to electrically engage ferry vehicle 19 for supplying electrical power to automobile 101 while in transit. Ferry vehicle 19 has a brake system 105 and a controller 107. Controller 107 automatically controls the operation of ferry vehicle 19. It receives control signals from a railway controller 109 and power from a power supply 111. Alternatively, vehicle 19 could also be passenger and/or cargo vehicle rather than a ferry for automobiles 101.

In operation, vehicle 19 will be propelled along guideways 11. As it moves along guideways 11, its permanent magnets 23 will create magnetic fields in the coils of levitating rails 17. This results in opposing magnetic fields that cause levitation of vehicle 19. Wheels 21 will raise up out of engagement with levitating rails 17. The propulsion from guideways 11 maybe caused by power coils 41 (FIG. 7) spaced at periodic intervals.

As vehicle 19 moves along guideways 11, it will be steered by permanent magnets 57 (FIG. 3). Permanent magnets 57 induce electrical currents in the coils of steering rail 55, which in turn create repelling magnetic fields tending to cause magnets 57 to remain at the same gaps from the side walls of the steering rail 55.

The invention has significant advantages. The mass transport system should be less expensive than prior art levitation systems because the sheet-wound rails should be less expensive than separate individually wound coils. The wheels of the vehicle, while not levitating, roll directly on the levitating rails, thus eliminating the need for separate heavy rails to support the vehicle. By handling the steering magnetically, rolling and sliding contact are reduced. The use of dual steering enables full-speed switching from one track to another. The vehicles move on non-stop basis at a synchronized speed under automatic control. All of the levitation, steering and electrical power transfer components are located inside enclosed rails for protection from weather elements. The open spaces between the two guideways enable light to pass between to the ground.

While the invention has been shown in only one of its forms. It should be apparent to those skilled in the art that it is not so limited but it is susceptible to various changes without departing from the scope of the invention.

I claim:

1. A transport system, comprising:
   a pair of levitating rails, each of the levitating rails having a core, a plurality of coils extending circumferentially around each of the cores perpendicular to lengths of the levitating rail, each of the levitating rails having an upper surface directly above the core;
   a vehicle having wheels that are adapted to roll on the upper surfaces of the levitating rails in a nonlevitated position and to be above the upper surfaces in a levitated position; and
   a plurality of magnets mounted to the vehicle, creating magnetic fields that pass through the coils while the vehicle is moving along the levitating rails to levitate the vehicle.

2. The transport system according to claim 1, wherein each of the cores has a longitudinal axis, and the upper surface of each of the rails is centered above the longitudinal axis.

3. The transport system according to claim 1, wherein the core is nonmagnetic.

4. The transport system according to claim 1, further comprising a propulsion source for causing the vehicle to move along the levitating rails.

5. The transport system according to claim 1, further comprising:
an electrical power source for applying an alternating current voltage to selected ones of the coils, the selected ones of the coils being spaced apart along the lengths of the rails to react with the magnetic fields of the magnets to cause longitudinal movement of the vehicle.

6. The transport system according to claim 1, wherein at least some of the coils are shorted to other of the coils with each wrap around the core.

7. The transport system according to claim 1, wherein the each of the levitating rails comprises a plurality of sheets wrapped around the core in multiple wraps, each of the sheets having a plurality of conductive strips formed thereon.

8. The transport system according to claim 1, further comprising:
a steering rail mounted adjacent at least one of the levitating rails, the steering rail having a plurality of coils wrapped around a core; and
a pair of steering magnets mounted to the vehicle and positioned on opposite sides of the steering rail, the steering magnets creating magnetic fields that pass through the coils of the steering rail and steer the vehicle by tending to remain substantially equidistant to the steering rail.

9. The transport system according to claim 1, further comprising:
a steering rail mounted adjacent each of the levitating rails, each of the steering rails having a plurality of coils wrapped around a core; and
two pairs of steering magnets mounted to the vehicle, each pair of steering magnets positioned on opposite sides of one of the steering rails while in an operational position, creating magnetic fields that pass through the coils of the steering rails for steering the vehicle, each pair of steering magnets being independently movable to a storage position in which the magnetic fields do not pass through the coils of the steering rails, to selectively steer the vehicle with either one of the steering rails.

10. The transport system according to claim 1, further comprising:
a steering rail mounted adjacent at least one of the levitating rails, the steering rail having a plurality of coils wrapped around a core;
a pair of steering magnets mounted to the vehicle and positioned on opposite sides of the steering rail, the steering magnets creating magnetic fields that pass through the coils of the steering rail and steer the vehicle by tending to remain substantially equidistant to the steering rail; and
a pair of rollers mounted to the vehicle and located on opposite sides of the steering rail for selective rolling contact with the steering rail to steer the vehicle at speeds that are too low to effectively steer with the steering magnets.

11. A transport system, comprising:
a pair of guideways;
a vehicle having wheels that locate in the guideways;
a steering rail mounted to one of the guide ways, the steering rail having a plurality of coils wrapped around a core; and
a pair of steering magnets mounted to the vehicle and positioned on opposite sides of the steering rail, the steering magnets creating magnetic fields that pass through the coils of the steering rail and steer the vehicle by tending to remain substantially equidistant to the steering rail as the vehicle moves along the guideways.

12. The transport system according to claim 11, further comprising:
a pair of rollers mounted to the vehicle and located on opposite sides of the steering rail for selective rolling contact with the steering rail to steer the vehicle at speeds that are too low to effectively steer with the steering magnets.

13. The transport system according to claim 11, further comprising:
a second steering rail mounted to the other of the guideways, the second steering rail having a plurality of coils wrapped around a core;
a second pair of steering magnets mounted to the vehicle and positioned on opposite sides of the second steering rail, the second pair of steering magnets creating magnetic fields that pass through the coils of the second steering rail and steer the vehicle by tending to remain substantially equidistant to the second steering rail as the vehicle moves along the wheel guides; and
the first mentioned pair of steering magnets and the second pair of steering magnets being alternately movable to a storage position in which their magnetic fields do not pass through either of the steering rails, such that only one pair of the steering magnets serves to steer the vehicle at one time.

14. A transport system, comprising:
a pair of laterally spaced apart guideways, each of the guideways having a shroud;
a levitating rail mounted within each of the shrouds, each of the levitating rails having a plurality of coils wrapped around a core;
a vehicle having wheels that are received within the shrouds and which contact the levitating rail while in nonlevitating operation and levitate above the levitating rails while in levitating operation;
a propulsion source for moving the vehicle forward; and
a magnet mounted to the vehicle above each levitating rail, the magnets creating magnetic fields that pass through the coils of the levitating rails as the propulsion source moves the vehicle forward to cause the vehicle to move to the levitating operation.

15. The transport system according to claim 14, further comprising:
a steering rail mounted within one of the shrouds, the steering rail having a plurality of coils wrapped around a core; and
a pair of steering magnets mounted to the vehicle and positioned on opposite sides of the steering rail, the steering magnets creating magnetic fields that pass through the coils of the steering rail and steer the vehicle by tending to remain substantially equidistant to the steering rail as the vehicle moves along the guideways.

16. A method of transporting a vehicle, comprising:

providing a pair of laterally spaced apart guideways with a first steering rail mounted to one of the guideways, the steering rail having a plurality of coils wrapped around a core;

positioning a vehicle on the track section, the vehicle having a pair of steering magnets mounted to the vehicle; and positioning the steering magnets on opposite sides of the steering rail and moving the vehicle along the guideways, causing magnetic fields of the steering magnets to pass through the coils of the steering rail and steer the vehicle by tending to remain substantially equidistant to the steering rail as the vehicle moves along the guideways.

17. A method of transporting a vehicle, comprising:

providing a main track section with laterally spaced apart first and second guideways, a steering rail mounted to the first guideway, the steering rail having a plurality of coils wrapped around a core;

connecting a switch track section to the main track section, the switch track section having laterally spaced apart first and second guideways that register with the first and second guideways of the main track section and lead away from the main track section, a first steering rail mounted to the first guideway of the switch track section that aligns and extends straight with the steering rail of the main track section, and a second steering rail mounted to the second guideway of the switch track section and leading away from the main track section, the first and second steering rails of the switch track section each having a plurality of coils wrapped around a core;

positioning a vehicle on the main track section, the vehicle having first and second pairs of steering magnets mounted to and on opposite sides of the vehicle;

positioning the first pair of steering magnets on opposite sides of the steering rail of the main track section and moving the vehicle along the main track section, causing magnetic fields of the first pair of steering magnets to pass through the coils of the steering rail of the main track section and steer the vehicle by tending to remain substantially equidistant to the steering rail of the main track section as the vehicle moves along the main track section; then at or prior to the switch track section, moving the first pair of steering magnets away from the steering rail of the main track section and moving the second pair of steering magnets on opposite sides of the second steering rail of the switch track section, causing magnetic fields of the second pair of steering magnets to pass through the coils of the second steering rail of the switch track section and steer the vehicle along the switch track section away from the main track section.

* * * * *